March 21, 1933.  C. A. SABBAH  1,902,468
ELECTRIC POWER CONVERTING APPARATUS
Filed Oct. 16, 1930
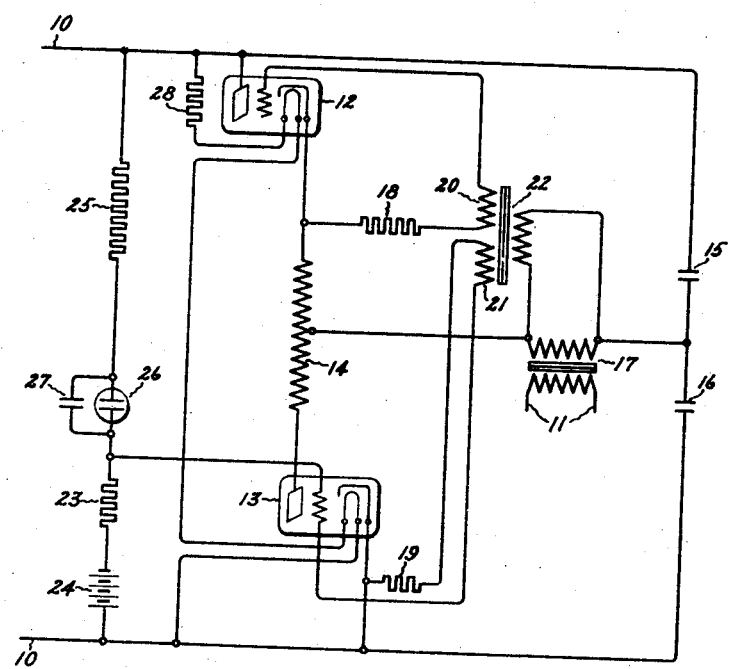
Inventor:
Camil A. Sabbah,
by Charles E. Mullen
His Attorney.

Patented Mar. 21, 1933

1,902,468

UNITED STATES PATENT OFFICE

CAMIL A. SABBAH, OF SCHENECTADY, NEW YORK, ASSIGNOR TO GENERAL ELECTRIC COMPANY, A CORPORATION OF NEW YORK

ELECTRIC POWER CONVERTING APPARATUS

Application filed October 16, 1930. Serial No. 489,149.

My invention relates to electric power converting apparatus and more particularly to such apparatus utilizing electric valves for converting direct current into alternating current.

Heretofore numerous arrangements have been proposed for converting direct current into alterating current by the use of various combinations of inductive windings, capacitors and electric valves connected either in series or in parallel across the direct current circuit. In each of these arrangements the load current is successively transferred between the electric valves and the successful operation of the apparatus depends upon the condition that the electric valves shall at no time conduct current simultaneously. If both valves become conductive at the same instant, a direct current flows at a constant rate through the apparatus the direct current impedance of which is sufficiently low to constitute a virtual short circuit which is likely to destroy the valves and injure the rest of the apparatus. The greatest likelihood of the occurrence of such short circuit condition appears in the starting of inverters of the self-excited type, i. e., those inverters in which the grid excitation of the electric valves is derived from the output circuit. While experience has proved that even in the starting of self-excited inverters the occurrence of such short circuit conditions is probably less than one in a thousand times, it is important that even this remote possibility of a short circuit should be eliminated. This is particularly true in certain instances such as in the case of inverters operated from a direct current electric railway trolley in which the direct current supply circuit is frequently interrupted as by arcing at the trolley or due to the trolley passing over insulated sections, crossings, switches etc. It is also a well-known fact that, in those inverters in which the cathodes of electric valves are heated either from the direct current supply or from the alternating current output, the electric valves may be seriously injured in case the supply voltage drops any considerable amount. This destruction of the valves with low heater voltage is due to the fact that the capacity of the valve is dependent upon the cathode emission which in turn is dependent upon its temperature. If the electric valves are operated above the electron emitting capacity of their cathodes it is a well-known fact that the cathodes may become destroyed by the positive ion bombardment. That is, with such inverters it is undesirable that they should operate when the supply voltage drops below a predetermined value.

It is an object of my invention to provide a protective circuit for electric power converting apparatus of the type known in the art as the self-excited inverter which will eliminate all possibilities of short circuit at starting.

It is a further object of my invention to provide a protective circuit for a self-excited inverter utilizing electric valves which will delay the excitation of one of the valves at starting in order to eliminate the possibility of both valves becoming conducting at the same instant.

It is a still further object of my invention to provide a protective circuit for a self-excited inverter utilizing an electric valve which will prevent operation of the inverter when the supply potential has dropped to a predetermined value.

In accordance with my invention I impress a negative bias potential upon the grid of one of the electric valves. This grid is also connected to the positive direct current line through a high resistance and a cold cathode electric discharge device of the type known in the art as a glow tube. This glow tube is shunted by a small capacitor to delay its break down. Normally the grid of this valve will be made negative and the valve maintained non-conducting by the negative bias in its grid circuit. When the direct current circuit is energized, however, the capacitor will be charged through the high resistance and, after a predetermined short interval, the glow tube will break down. The resistance of this circuit connecting the grid to the positive direct current line is so proportioned as to just neutralize the negative bias in the grid circuit when the glow tube breaks down and becomes conducting. With this arrangement the excitation of the valve in question is delayed a sufficient length of time to insure that the other valve will always be excited first.

For a better understanding of my invention, together with other and further objects thereof, reference is had to the accompanying drawing and its scope will be pointed out in the appended claims. The single figure of the accompanying drawing illustrates one embodiment of my invention as applied to a self-excited series type inverter in which the cathodes of the electric valves are heated from the direct current supply.

Referring to the drawing I have illustrated an apparatus for receiving direct current from the circuit 10, converting it into alternating current and transmitting it to a receiving circuit 11. This apparatus comprises two series circuits connected in parallel across the direct current source. The first of these series circuits includes an electric valve 12, an inductive winding 14 and an electric valve 13, respectively, while the second circuit includes capacitors 15 and 16. The load circuit 11 is connected to the secondary winding of a transformer 17 the primary winding of which is connected between the electrical mid-point of the inductive winding 14 and the junction between the capacitors 15 and 16, although, if desired, the transformer 17 may be omitted and the load circuit 11 connected directly between these two points. The electric valves 12 and 13 are each provided with an anode, a cathode, a cathode heater and a control grid and may be of any of the several types well-known in the art though I prefer to use valves of the vapor electric discharge type in which the starting of the current in the valve is determined by the potential of the control grid but in which the current through the valve may be interrupted only by reducing its anode potential below the critical value. The grid circuits of the electric valves 12 and 13 include the current limiting resistors 18 and 19 and the secondary windings 20 and 21, respectively, of the grid transformer 22 the primary winding of which is connected in parallel to the primary winding of the transformer 17. The grid of the electric valve 13 is also connected to its cathode through a current limiting resistor 23 and a negative bias battery 24 and to the positive direct current line through a resistor 25 preferably having a very high resistance and a cold cathode discharge device shown as a glow tube 26. The glow tube 26 is shunted by a capacitor 27.

It will be assumed that the direct current circuit 10 is initially deenergized. In this condition, the grid of the electric valve 13 is negative with respect to its cathode by the potential of the bias battery 24, while the grid of electric valve 12 is at the same potential as its cathode so that the valve 12 is conducting while the valve 13 is non-conducting. When the direct current circuit 10 is energized current will flow through the electric valve 12, the upper portion of the inductive winding 14, the primary winding of the transformer 17 and the capacitor 16 to the negative direct current line 10. At the same time a small current will flow through the high resistance 25, the capacitor 27, the resistor 23 and the negative bias battery 24 which will tend to charge the capacitor 27 to the difference in potential between the direct current circuit 10 and the bias battery 24. However, the glow tube 26 will break down when the capacitor 27 becomes charged to some predetermined potential which is relatively low compared to that of the direct current circuit 10 so that this capacitor will discharge through the glow tube 26. With the glow tube 26 conducting, the resistances 23 and 25 of this circuit are so proportioned that the current flowing through these resistors produces a potential drop in the resistor 23 which just neutralizes that of the negative bias battery 24 with the result that no potential is impressed between the grid and cathode of the valve 13 by this circuit. The time required to build up a sufficient potential on the capacitor 27 to break down the glow tube 26 will, of course, depend upon its size and upon the value of the resistance in its charging circuit. These circuit elements are preferably so proportioned that the glow tube 26 will break down just before the completion of the first half-cycle of the alternating current output. When current flows from the source 10 through the electric valve 12 and the circuit traced above, the potential appearing across the primary winding of the transformer 17 is also impressed across the primary winding of the grid transformer 22 and this potential is induced in the secondary windings 20 and 21 which are so connected as to impress a negative potential upon the grid of the electric valve 12 and a positive potential upon the grid of electric valve 13. By the time the grid of the electric valve 13 has received a positive potential from the grid transformer 22 the negative bias of the battery 24 has been neutralized by the potential across the resistor 23, as explained above, and the valve 13 becomes conducting. Current now flows from the positive direct current line 10 through the capacitor 15, the primary winding of the transformer 17, the lower half of the inductive winding 14 and the electric valve 13 to the direct current line. As the current flows through the lower half of the inductive winding 14 it will induce a potential of opposite polarity in the upper half of this winding which will instantly interrupt any residual current in the valve 12 which may be due to improper phase relations between the grid potentials and the potential of the load circuit 11. At the end of another half-cycle the grid potential again reverses polarity and the current is transferred from the valve 13 to the valve 12 in a similar manner. During alternate half-cycles it will be noted that current flows from the direct current source 10 through the primary winding of the transformer 17 in opposite directions so that an alternating potential is delivered to the load circuit 11.

Another feature of the operation of my improved protective arrangement consists in its ability to interrupt the operation of the inverter in case the potential of the direct current circuit 10 falls below a predetermined value. As explained above, in case the supply potential drops below a predetermined value so that the voltage and, consequently, the temperature of the cathode heaters of the valves 12 and 13 drop below the safe operating limits, it is desirable that the operation of the inverter should be interrupted. If now the potential of the source 10 drops, the potential across the resistor 23 will also drop a corresponding amount with a result that the grid of the valve 13 will be negative with respect to its cathode. The amount of its negative potential required to maintain the valve 13 non-conducting will of course depend upon the characteristics of the valve and the magnitude of the grid potential applied to the secondary winding 21 of the transformer 22, so that the potential at which the operation of the inverter is interrupted may have any predetermined value according to the proper selection of these factors. It will be well understood by those skilled in the art that if the valve 13 is maintained non-conducting the operation of the inverter will cease as soon as the capacitor 16 becomes charged to substantially the potential of the direct current circuit 10. While I have illustrated my invention as applied to a straight series type self-excited inverter it will be obvious to those skilled in the art that this protective arrangement may be similarly applied to the so-called cross series type inverter and to the parallel type inverter without departing from my invention. However, when my protective arrangement is applied to a parallel type inverter it is not effective to interrupt the operation of the inverter upon a decrease in a direct current supply potential since, in that circuit, current is always flowing in one or the other of the valves.

While I have described what I at present consider the preferred embodiment of my invention, it will be obvious to those skilled in the art that various changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In combination with an electric power converting apparatus including a plurality of electric valves, means for normally controlling the conductivity of the said valve, and means independent of said conductivity controlling means for maintaining one of said valves non-conductive for a predetermined time interval upon initiation of the operation of said apparatus.

2. In combination with an electric power converting apparatus including a direct current circuit and a plurality of electric valves adapted to be rendered conductive in a predetermined sequence, means for maintaining one of said valves non-conducting, and means responsive to the potential of the direct current circuit for overcoming said first mentioned means to render said valve conductive a predetermined time interval after initiation of the operation of said apparatus.

3. In combination with an apparatus for converting direct current into alternating current including a direct current circuit and a plurality of electric valves serially connected across said circuit, means for rendering one of said valves non-conducting to interrupt the operation of the apparatus upon a predetermined decrease in the potential of the direct current circuit.

4. In combination with an apparatus for converting direct current into alternating current including a direct current circuit and a plurality of electric valves serially connected across said source, said valves being provided with cathodes heated from said direct current circuit, means for rendering one of said valves non-conducting to interrupt the operation of the apparatus upon a decrease in the potential of the direct current circuit to such a value that the valves are operating beyond their normal capacity of electron emission.

5. In combination with an apparatus for converting direct current into alternating current including a direct current circuit and a plurality of electric valves serially connected across said circuit, means for maintaining one of said valves non-conducting for a predetermined time interval upon initiation of the operation of said apparatus and for rendering said valve non-conducting to interrupt the operation of the apparatus upon a predetermined decrease in the potential of the direct current circuit.

6. In combination with an electric power converting apparatus including a direct current circuit and a plurality of electric valves adapted to be rendered conductive in a predetermined sequence, means for controlling the conductivity of one of said valves comprising means tending to maintain said valve non-conducting, means responsive to the potential of the direct current circuit neutralizing said second mentioned means, and means for delaying the effect of said neutralizing means for a predetermined time interval after the energization of said direct current circuit.

7. In combination with an electric power converting apparatus including a direct current circuit and a plurality of electric valves provided with control elements adapted to be energized to render said valves conductive in a predetermined sequence, means for controlling the excitation of one of said valves comprising means for energizing the control element of said valve to maintain it non-conductive, means responsive to the potential of said direct current circuit for neutralizing said energizing means, and time delay means associated with said neutralizing means.

8. In combination with an electric power converting apparatus including a direct current circuit and a plurality of electric valves provided with control elements adapted to be energized to render said valves conductive in a predetermined sequence, means for controlling the excitation of one of said valves comprising a circuit for the control element of said valve including a source of negative bias potential, a source of neutralizing positive potential derived from said direct current circuit, and means for delaying the energization of said neutralizing source for a predetermined time interval after the energization of said direct current circuit.

9. In combination with an electric power converting apparatus including a direct current circuit, a plurality of electric valves provided with control grids adapted to be energized to render said valves conductive in a predetermined sequence, means for controlling the excitation of one of said valves comprising a grid circuit for said valve including a negative bias battery and a resistor, a connection from said grid to the positive direct current line including a resistor and means for holding back the flow of current from said direct current line for a predetermined interval after its energization.

10. In combination with an electric power converting apparatus including a direct current circuit, a plurality of electric valves provided with control grids adapted to be energized to render said valves conducting in a predetermined sequence, means for controlling the excitation of one of said valves comprising a grid circuit for said valve including a negative bias battery and a resistor and a connection from the grid of said valve to the positive direct current line including a resistor, a cold cathode glow discharge device, and a capacitor connected in parallel to said discharge device.

11. In an electric circuit including a source of direct current and an electric valve provided with an anode, a cathode, and a control electrode, means for controlling the conductivity of said valve comprising a circuit connecting said cathode and control electrode including a negative bias battery and an impedance, means for sending a current through said impedance from said source in such a direction as to oppose the potential of said battery, and means for delaying said flow of current from said source until a predetermined time interval after the energization of said source.

12. In an electric circuit including a source of direct current and an electric valve provided with a control electrode, means for controlling the conductivity of said valve comprising a circuit connected across said source including a resistor, a cold cathode glow discharge device, a second resistor and a negative bias battery respectively, a capacitor connected across said discharge device, and a connection from said control electrode to the junction between said discharge device and said second mentioned resistor.

In witness whereof, I have hereunto set my hand this 15th day of October, 1930.

CAMIL A. SABBAH.